(12) United States Patent
Scherrer et al.

(10) Patent No.: US 11,281,181 B2
(45) Date of Patent: Mar. 22, 2022

(54) CONFIGURABLE SAFETY MODULE FOR DETECTING DIGITAL OR ANALOG INPUT OR OUTPUT SIGNALS

(71) Applicant: Bachmann GmbH, Feldkirch (AT)

(72) Inventors: Christoph Scherrer, Feldkirch (AT); Walter Nasahl, Feldkirch (AT)

(73) Assignee: BACHMANN GMBH, Feldkirch (AT)

( * ) Notice: Subject to any disclaimer, the term of this patent is extended or adjusted under 35 U.S.C. 154(b) by 601 days.

(21) Appl. No.: 16/157,700

(22) Filed: Oct. 11, 2018

(65) Prior Publication Data

US 2019/0107818 A1    Apr. 11, 2019

(30) Foreign Application Priority Data

Oct. 11, 2017 (DE) .......................... 102017123615.5

(51) Int. Cl.
*G05B 19/05* (2006.01)

(52) U.S. Cl.
CPC .... *G05B 19/058* (2013.01); *G05B 2219/1105* (2013.01); *G05B 2219/14054* (2013.01); *G05B 2219/14144* (2013.01); *G05B 2219/15078* (2013.01)

(58) Field of Classification Search
None
See application file for complete search history.

(56) References Cited

U.S. PATENT DOCUMENTS

| 7,593,205 | B2 | 9/2009 | Veil | |
|---|---|---|---|---|
| 9,651,931 | B2 | 5/2017 | Hopsecger et al. | |
| 2009/0254312 | A1* | 10/2009 | Kube | G06F 11/273 |
| | | | | 702/186 |
| 2015/0295524 | A1 | 10/2015 | Kangas et al. | |
| 2016/0118212 | A1* | 4/2016 | Veil | H01H 71/10 |
| | | | | 307/326 |
| 2016/0266564 | A1 | 9/2016 | Hopsecger et al. | |
| 2016/0282818 | A1* | 9/2016 | Obrecht | G05B 19/058 |
| 2018/0059180 | A1* | 3/2018 | Rangachari | G01R 31/31901 |

FOREIGN PATENT DOCUMENTS

| CN | 101 228 486 A | 7/2008 |
|---|---|---|
| CN | 104 979 803 A | 10/2015 |
| CN | 105 974 827 A | 9/2016 |
| DE | 10 2010 050 186 A1 | 5/2011 |
| WO | 20130131900 A1 | 9/2013 |

* cited by examiner

*Primary Examiner* — Ryan A Jarrett
(74) *Attorney, Agent, or Firm* — Browdy and Neimark, PLLC (57) ABSTRACT

A safety module for a programmable logic control system, wherein the safety module is designed as an assembly consisting of a plurality of modules with a plurality of function blocks connected through at least one internal bus and comprising at least one CPU and which can be connected through at least one interface to external sensors (and switches/buttons) and actuators (and optical/acoustic indicators and displays/monitors) for detecting at least one measurement signal, wherein the safety module operates in two channels and a self-test is implemented.

7 Claims, 7 Drawing Sheets

CONFIGURABLE SAFETY MODULE FOR DETECTING DIGITAL OR ANALOG INPUT OR OUTPUT SIGNALS

The subject matter of the applicant's own applications DE 20 2010 018 269 U1 or DE 10 2010 050 186 A1 has disclosed an input and output module for programmable logic controls, the module being freely configurable by means of externally applied signals.

The disadvantage of this prior art is that such modules are not designed using safety criteria since it is not possible to check for a malfunction of such a module.

Therefore, the objective of the invention is to now improve on the technology known from DE 20 2010 018 269 U1 which includes freely configurable modules by allocating additional safety functions to the module.

The solution to the problem posed is accomplished by a safety module for a programmable logic control system, wherein the safety module is designed as an assembly consisting of a plurality of modules with a plurality of function blocks connected through at least one internal bus and comprising at least one CPU and which can be connected through at least one bi-directional interface to external sensors (and switches/buttons) and actuators (and optical/acoustic indicators and displays/monitors) for detecting at least one measurement signal, wherein the safety module operates in two channels and that a self-test is implemented.

The feature of the invention is that the module now operates in a dual-channel mode and that a self-test is implemented.

The concept of a fully-configurable module is now improved upon by introducing innovative test methods for use in safety-critical systems.

Until now there have existed no fully-configurable input and output modules for analog and digital parameters suitable to be used for safety purposes.

Another central property of the module according to the invention is that the measurement signals are detected in multiple stages. Rapid scanning is suitable for supplying measurement in a non-safety-oriented standard PLC rule. The slower downstream scanning occurs synchronously with the safety control cycle and provides fail-safe values.

The invention is therefore a configurable digital and analog input and output module for safety-related systems, characterized by 1. The physically different measurement parameters of voltage, current and frequency are detected using a unitary circuit.
2. The physically different output parameters of voltage and current are output using a unitary circuit.
3. The measurement parameter to be detected or output is configured through software.
4. The voltage and current detection system processes analog and digital signals.
5. The filtering of the input signal is fully configurable.
6. Signal detection for safety-related systems uses a device corresponding to Point 1 and 2.
7. Generation of test signals using the same circuit in which the useful signal is evaluated together with the test signal.
8. Testing redundant channels without interrupting the input signals and maintenance of the measurement precision.
9. Simultaneous detection of measurement parameters for fail-safe ongoing processing by a safety-oriented PLC and for non-fail-safe processing by a standard PLC. In the process, scanning can be done at a higher scan rate for non-fail-safe processing than for safety-oriented processing.
10. Decision features of analog input parameters on the module, characterized by
    a. Configurable measurement pre-processing
    b. Configurable voting mode For fail-safe detection, output, pre-processing and communication of data, the data processing is basically done in two independent redundant channels, with an optional downstream comparator (voter) (category 3 and 4 system pursuant to EN/ISO 13849). An alternative mode is the single-channel detection and output of signals with correspondingly more frequent testing of the channel (category 2 system pursuant to EN/ISO 13849). The outward signal interface is implemented using appropriately arranged and fully-configurable ASIC's of identical design. After being galvanically separated, the signals are further processed in two independent CPU's and then sent through the communication interface according to the black channel principle. For output parameters, the signal flow occurs in the opposite direction. A basic property of the module is the input and output mode of each individual signal channel which can be configured entirely by the user.

A significant point in the implementation of the fail-safe modules according to the invention, in the sense of functional safety, is the capability of the modules to test themselves at regular intervals and to recognize possible errors occurring in the module at an early stage, and thereby to prevent an accumulation of errors through the two redundant channels. Specifically, if such an accumulation occurs, the downstream comparator (voter) could make false-positive decisions.

Below, the individual modes and related test methods are described in more detail:

The self-test required in safety-oriented assemblies is done according to the following principle: A suitable test signal tuned to the input filter of the ASICS is added to the measurement signal of one channel at a time in alternating fashion, the test signal being generated by a separate ASIC of identical design. After scanning and filtering by the ASIC, the test signal is removed again by the next CPU and the signal thus recovered is compared to that of the second, redundant signal. If both signals within a configurable tolerance band are equal, the test is deemed to have been passed. In the next test cycle, the test signal is added to the other measurement signal and the other ASIC tested thusly.

As an alternative to this method of testing, it is also possible to implement the test by subjecting the two channels with measurement signals which are inverted with respect to one another.

Also an alternative to this method of testing is to check the linearity of the ADC converter characteristic curve by occasionally switching the measurement range of a channel.

For safety-oriented detection of temperature by means of a suitable sensor, the required testing is carried out by modulating the measured current, said modulation being possible in the ASIC and matched to the configurable input filter. Then, the test signal is subtracted by the CPU and the signal so recovered is compared with the signal of the second channel.

Figure 3:
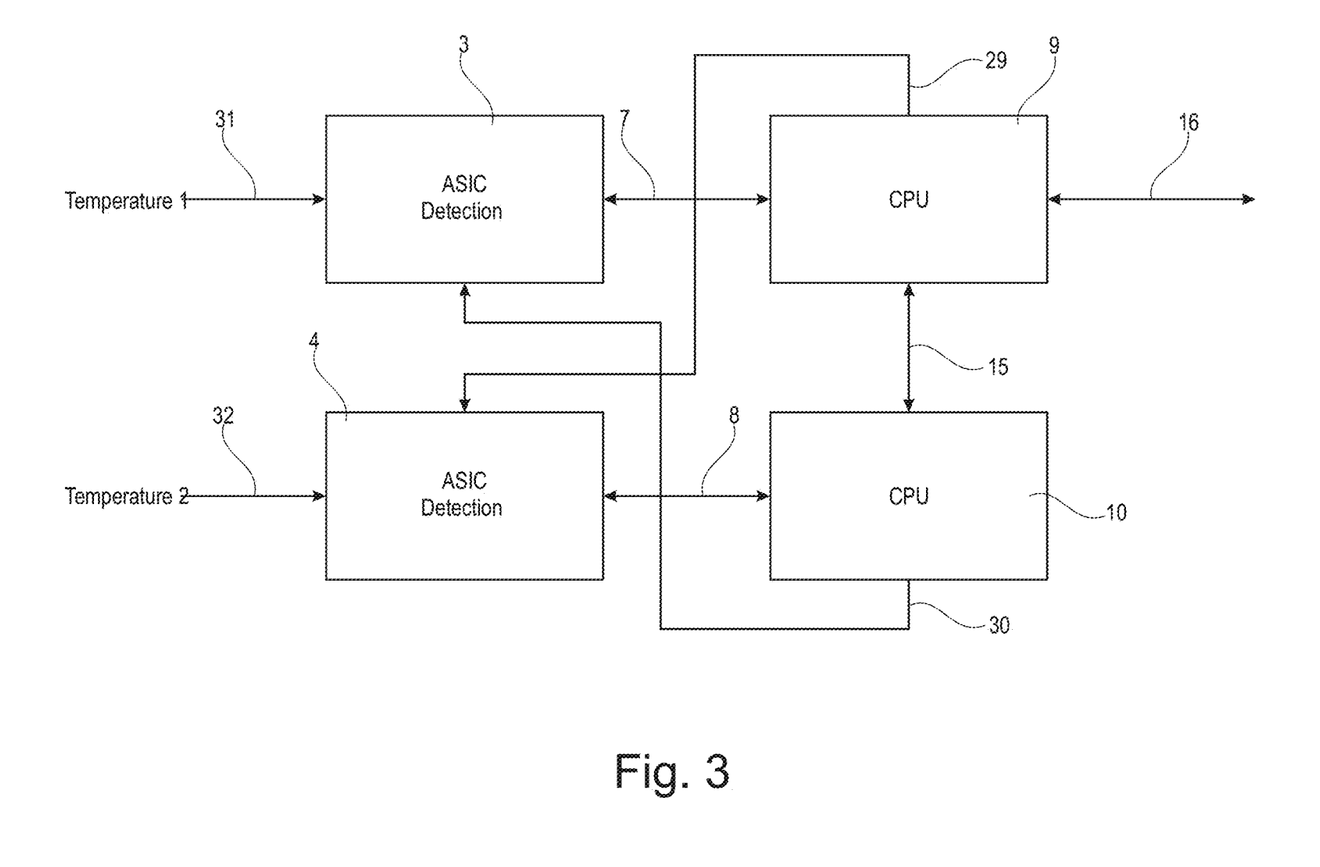
FIG. 3: A test circuit for safety-oriented detection of temperature.

What is essential in the fail-safe digital inputs according to the invention is that ongoing testing is performed as to whether an input is still correctly reacting to a "low" signal since a negative Boolean value at the input represents a safety requirement according to the quiescent current principle. Shown in FIG. 3 is the fact that this ongoing testing in turn occurs by way of feeding in and subtracting a signal generated by a separate ASIC of identical design. The testing of both channels is done in alternating fashion.

For digital outputs, it is important to ensure that the outputs can be switched at all times in a non-energized state in order to carry out the safety function. Therefore, in general dual shut-off is provided, once at the level of the individual output channel and, should the shut-off not have been successful, at a higher level for all output channels of the module. An explicit testing is not provided due to the influence of the external process being monitored.

The testing of the ASIC functionality in the frequency measurement mode (encoder mode and counter mode) is performed by subjecting, in alternating fashion, the measurement channels to known frequencies which can also be generated in the ASIC in the PWM operating mode.

Alternatively, this test can also be foregone, and a simple cross-check of the two redundant channels can be performed.

The module is also characterized by the fact that the signals are detected at a high scan rate and can be made available to a non-fail-safe PLC. This procedure facilitates implementation of rapid regulation without requiring a separate data collection module. At the same time, the signals are metrologically compressed (minimum, maximum, mean value) in a configurable way by a safety cycle and then voted on in the module as an option. There is also a variety of configurable modes available for purposes of voting. For example, either the mean value of the two channels, the maximum value or the minimum value of the safety-oriented PLC can be forwarded. This two-stage procedure enables there to be no aliasing effect when the safety-oriented detection of signals is performed even though the primary filters in the ASIC are configured for higher scan rates.

The invention focuses on the fact that from the starting point of a control system designed as a dual-channel safety control unit comprising a self-test function, a freely-programmable safety module according to the invention now results.

The free programmability refers to two signal detection modules disposed in parallel with one another which after configuration comprise an input for current or voltage, an input for detecting the frequency, an input for detecting a temperature and any number of other configurable signal inputs so that said inputs form a universal analog input.

What is essential in the invention is that the safety module is designed as dual-channeled, comprising two separate channels, and therefore that each of the associated signal detection modules is assigned to one channel, respectively.

The signal detection modules are a component of the safety module according to the invention, and all modules are disposed on a single slot.

The advantage of arranging the signal detection modules on a continuous, unitary circuit board is that the number of slots is consequently reduced, and the customer only needs one module—a multi-functional module.

The subject matter of the present invention does not simply derive from the subject matter of the individual patent claims, but also from the combination of the individual patent claims with one another.

All information and features disclosed in the references, including the abstract, in particular the spatial design represented in the drawings, are claimed as essential to the invention to the extent that they are novel over the prior art individually or in combination.

Below, the invention is explained in further detail with the aid of drawings which represent only one embodiment.

Other features and advantages essential to the invention follow from the drawings and the description thereof.

Figure 1:
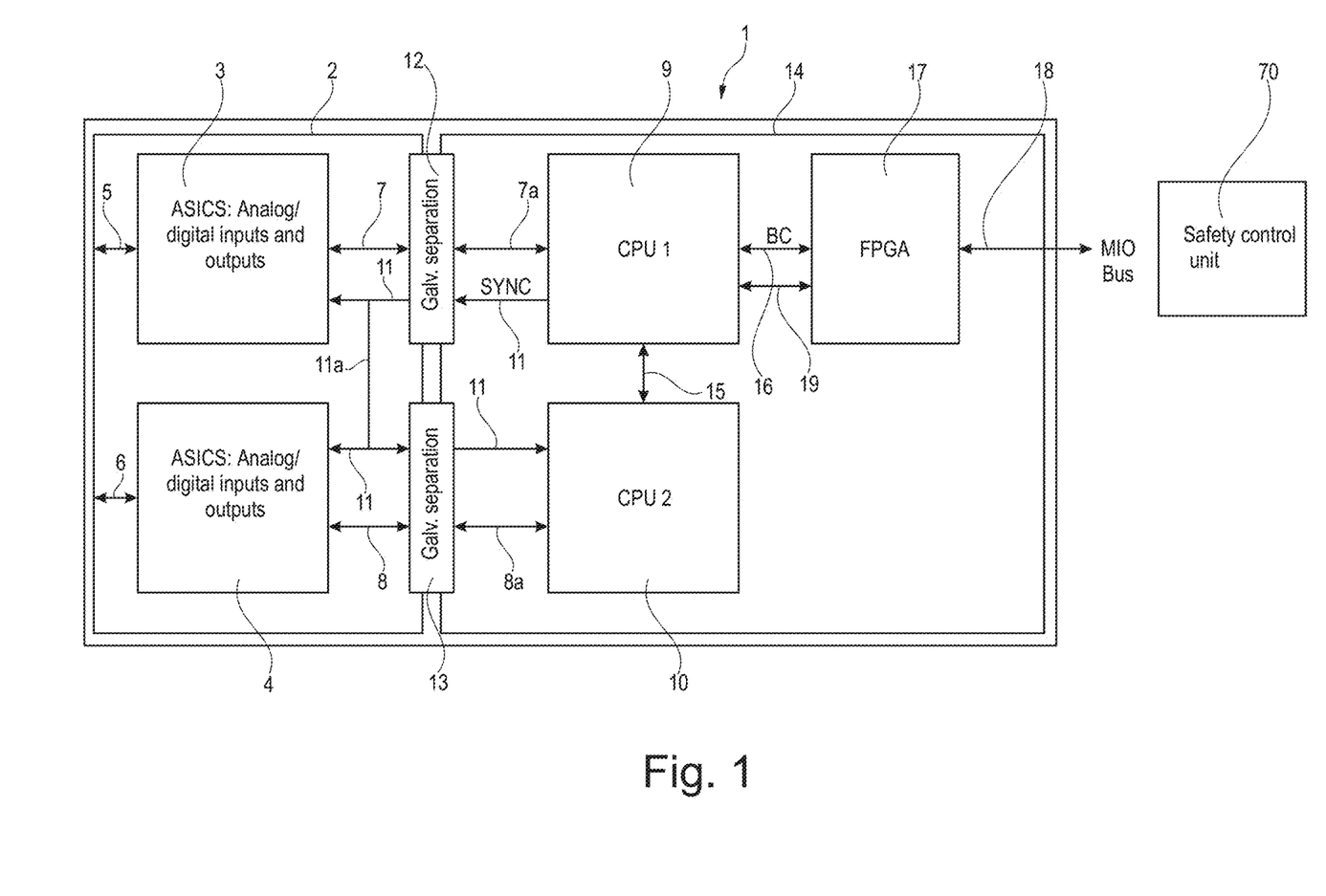
FIG. 1: A block diagram of a safety architecture of a freely-programmable module.

In the exemplary embodiment according to FIG. 1, the safety module 1 comprises two signal detection modules 3, 4 in parallel with one another, the modules being freely configurable.

The result is that the overall safety module 1 is configurable and thus also the signal detection modules 3 and 4 using the safety control unit 70 disposed at the output.

The term "safety control unit" clarifies that this machine control system is also constructed according to safety criteria corresponding to norms, i.e., the system consists of two channels which mutually check one another and also a self-test which facilitates the recognition of and compensation for any errors in signal transmission or signal generation of the safety control unit 70.

However, the two channels which are shown parallel to one another in the preferred embodiments do not need the inputs to these channels to also be identical in design. Thus, this is not a redundant detection of the same analog signals connected to the input of these signal detection modules, but rather said modules can also detect non-identical signals of the same class, such as current/voltage/temperature or the like.

This is an optional solution; however, parallel detection of the same signals is possible in another embodiment.

The detection of the same signals or signals of the same type depends on the type of safety step required in safety module 1.

The left part of module 1 consists essentially of a data detection module 2 in which the two freely-configurable signal detection modules 3 and 4 are disposed.

The inputs thereof are formed by a respective interface 5, 6 at which the analog signals are applied; these signals will be explained later.

After analog data collection, conversion to digital signals takes place in a respective signal detection module 3, 4 and the output signal of the signal detection module is output to a galvanic separation 12, 13 by way of a respective digital bus 7, 8.

The galvanic separation can be designed here as an optocoupler or the like.

What is important is that a data evaluation module 14 is disposed on the other side of the galvanic separation 12, 13, wherein two separately operating CPU's 9, 10 are disposed in said data evaluation module.

CPU 1—which is designed as a clock—conducts the clock signal over the clock line 11 through the galvanic separation to downstream clock line 11 and routes said pulse to the signal detection module 3.

In parallel with this, the pulse is also forwarded through branch 11a through the clock line 11 thereat to the second signal detection module 4.

In an improvement of the invention, synchronization of the clock signal generated by CPU 9 can also be performed through I/O bus 18.

Due to the synchronous timing of the two signal detection modules 3 and 4, the data are not forwarded to the respective CPU's 9 and 10 through the digital buses 7 and 8 in a precisely-synchronized manner.

When voting mode is turned on, CPU 10 checks and compares the data generated by signal detection modules 3 and 4, respectively.

Digital bus 15 reports the data comparison to CPU 9 and CPU 9 correspondingly forwards the thus generated and detected data to an associated logic module 17 through a black channel 16.

This logic module 17 is freely programmable and performs a signal adjustment in order to output the generated and detected signals safely to I/O bus 18 where the signals are fed into the safety control unit 70.

In parallel to the black channel 16, another non-fail-safe data channel 19 is provided so that safety module 1 is only able to effectuate data transfer of exclusively fail-safe data, such as through a black channel 16 or to transfer other data in parallel over a non-fail-safe data channel 19.

Figure 7:
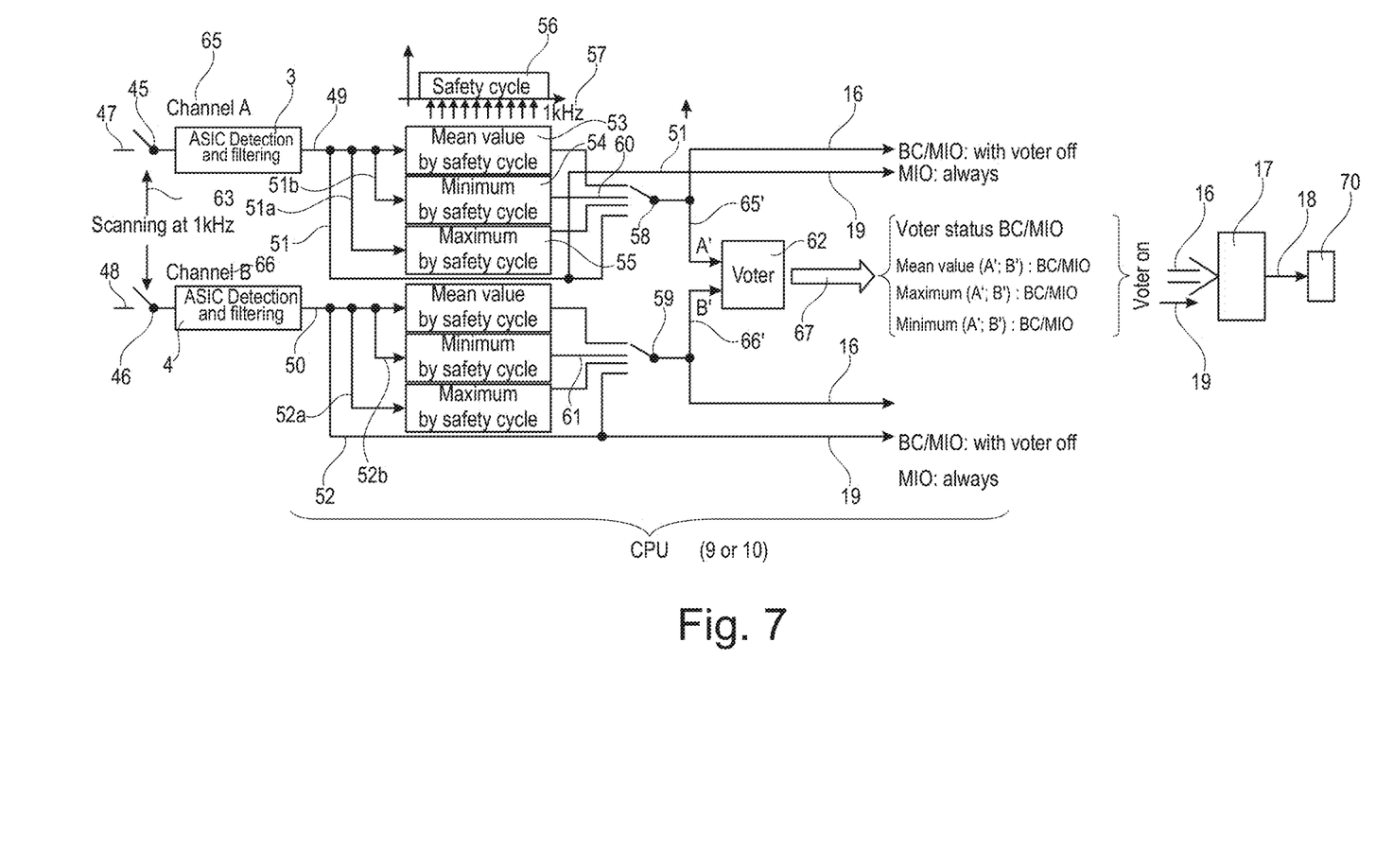
FIG. 7: An exemplary general modular design of the CPU described in the exemplary embodiments.

In the process it must be noted that CPU's 9 and 10 are designed essentially the same and this is explained further in FIG. 7.

Therefore, a decision module 62 can be disposed not only in CPU 10, which operates in voting mode as a checking entity, but such a decision module can also be disposed in CPU 9 as a voting entity.

Figure 2:
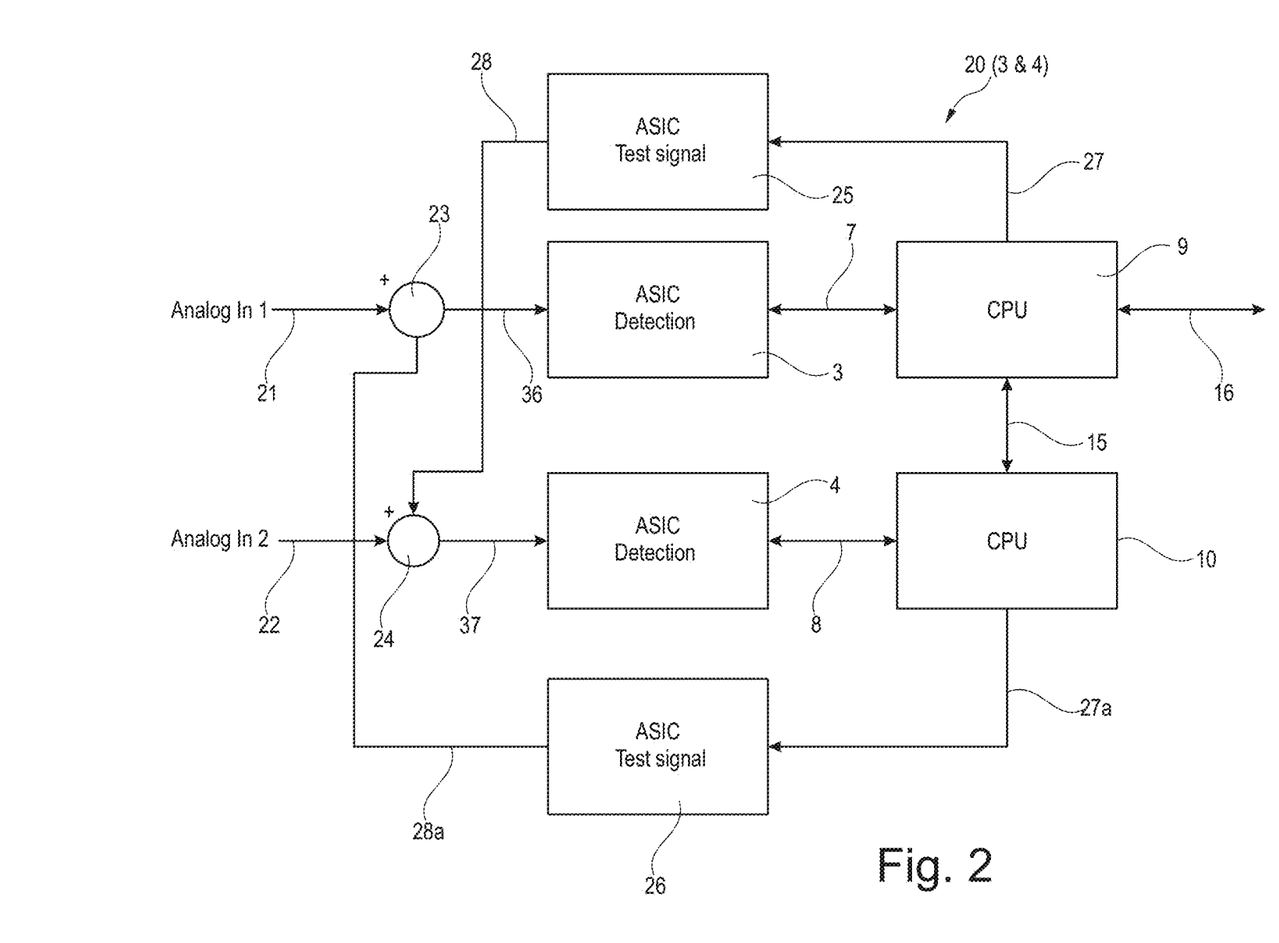
FIG. 2: A test circuit for detecting voltage and current in the modular design according to FIG. 1.

FIG. 2 shows an exemplary embodiment of a first test circuit 20 which is used to check the current or voltage signals in effect at the analog inputs 21 and 22.

Each respective analog input 21, 22 is connected to a respective adder 23, 24, wherein an additional signal is sent to the signal of the analog input 21, 22 over a line 28, 28*a*, the additional signal coming from a signal generator 25, 26.

The respective signal generator 25, 26 is programmed by the associated CPU 9 and 10 such that the generator produces a specific test signal which is output through lines 28 and 28*a* to the respective adder 23, 24.

Then, the sign so increased is fed into the respective input of signal detection module 3, 4 through lines 36, 37.

By increasing a test signal by addition, an additional control can be done in the ASIC detection (signal detection module 3, 4). The respective signal generators 25, 26 can generate a freely programmable analog signal, such as a sawtooth pattern, a square signal, a sinusoidal or other signal shapes.

Thus, a precisely-defined additional signal is added to the respective analog signals at the inputs 21, 22 and the signal detection modules 3, 4 so programmed forward the synthetically modified input signal through digital buses 7, 8 to CPU 9 and 10, which now check to see if the input signal was correctly superimposed with the additional test signal and was correctly received.

If the test result is positive, the output signal is forwarded through the black channel 16 in a fail-safe manner for further data processing.

What must be noted is that the test circuits according to FIGS. 2, 3, 4 and 5 represent the programming possibilities of the signal detection modules 3, 4 according to the invention. The free programmability of the signal detection modules 3 and 4 are due to the multitude of possible test circuits shown in FIGS. 3 to 5.

In FIG. 3, another test circuit is shown which can be set up in signal detection modules 3, 4 in a freely programmable manner. The test circuit relates to the processing of two different temperature values in effect at analog temperature inputs 31, 32.

Also here, an associated test signal is modulated according to the analog input of the respective signal detection module 3, 4 from the respective CPU 9 and 10 through modulation lines 29 and 30 and the output signal is fed through the digital bus lines 7, 8 of CPU 9 and 10 for checking. A mutual comparison is done here as well by CPU's 9 and 10 through digital bus 15 and only when agreement of the detected signals is established is the detected signal fed through black channel 16 for further data processing.

Figure 4:
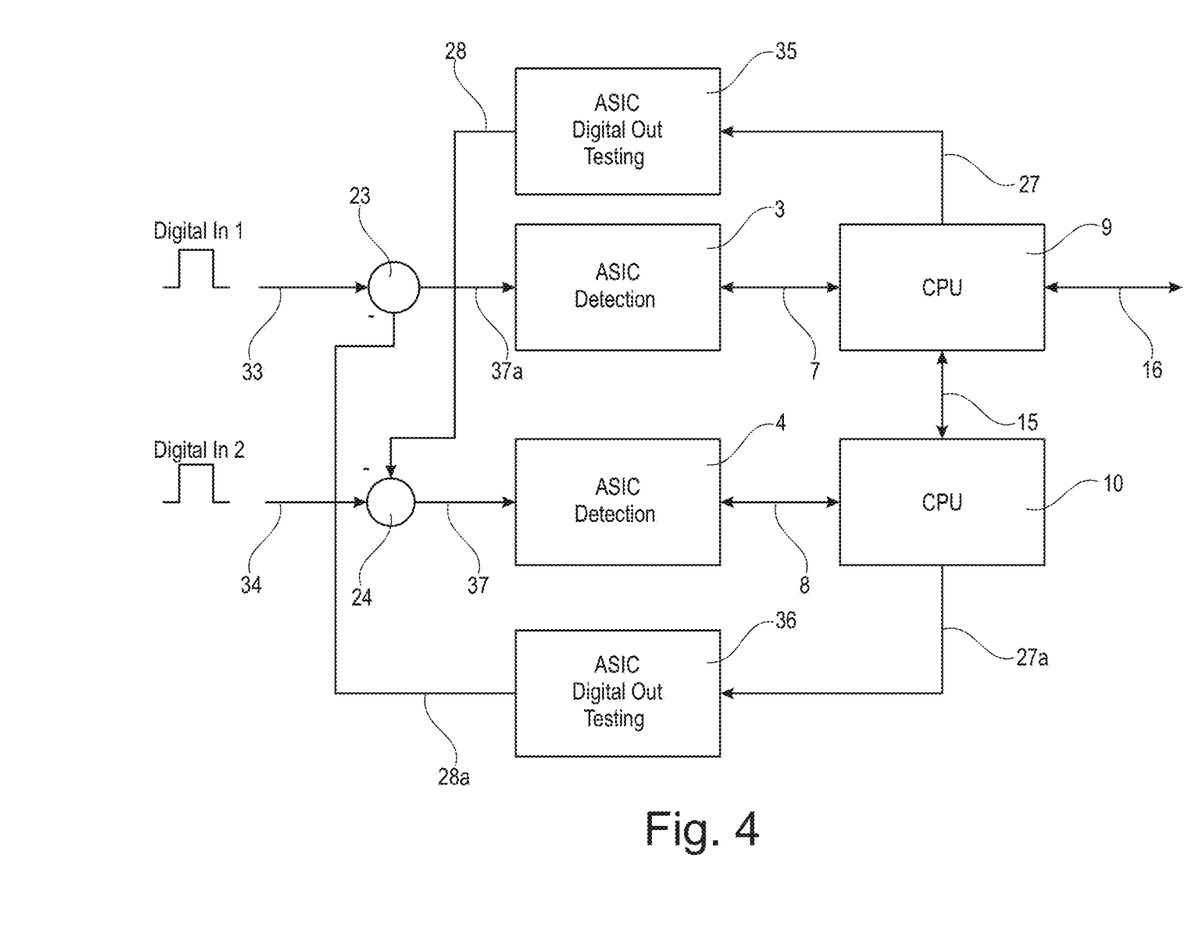
FIG. 4: A test circuit for testing a digital input.

In FIG. 4, a third option for free programmability of the two signal detection modules 3, 4 according to the invention is illustrated.

In this case, a fail-safe digital input is checked and tested.

A digital signal is applied at the digital inputs 33, 34, respectively; this signal can be a logical 1 or a logical 0.

This signal is transmitted to the respective adder 23, 24 and an additional test signal is added through the associated lines 28, 28*a*.

In the associated signal generators 35 and 36, the respective test signal is fed through lines 28, 28*a* to the respective adder 23, 24 in the form of a logical 1 or 0 signal.

The lines 37, 37*a* leading from the adders 23, 24 then forward the changed signal thus generated to the associated signal detection module 3, 4 and this signal thus changed is forwarded to the two CPU's 9 and 10 through the respective digital bus 7 and 8 and checked in these CPU's.

Not until a safety check is performed and a positive determination results is the signal so detected forwarded through the black channel to the next data processing step.

The output of the output signal at the black channel 16 occurs when the respective CPU 9, 10 has removed the test signal from the useful signal again.

Figure 5:
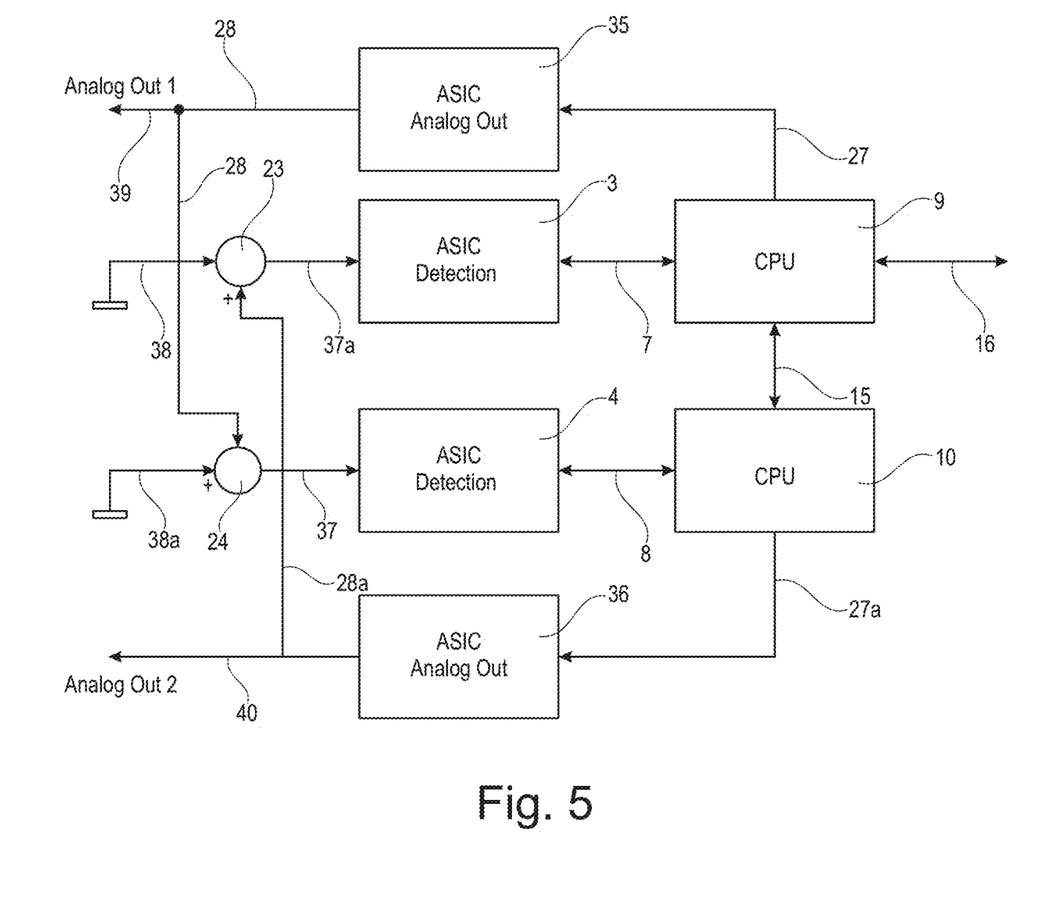
FIG. 5: A test circuit for testing analog outputs.

FIG. 5 shows a fourth embodiment of the programmability of the signal detection modules 3, 4 where it can be seen that analog outputs now must be checked.

The respective adder 23, 24 is connected to a measurement connection 38, 38*a* and the analog output 39 is fed to the lower adder 24 in a branch off of line 28.

Likewise, analog output 40 is transmitted to adder 23 in a branch off of line 28*a*.

Accordingly a cross-over switching of signals to the respective adder 23, 24 occurs both in FIG. 4 as well as FIG. 5.

However, the invention is not limited to this. Instead of a cross-over switching, a direct switching of the signals to the respective adder 23, 24 could also occur.

To the extent that such a cross-over switching is shown in the drawings, this serves only to explain the exemplary embodiment shown. However, such a cross-over circuit could be foregone or a direct switching to the respective adder 23, 24 could be implemented.

In the exemplary embodiment shown, analog output 40 is switched through line 28*a* to adder 23 and through line 37, 37*a* the analog output signal thus changed is detected by the respective signal detection module 3, 4.

What is important is that CPU's 9, 10 directly feed the analog output signal to signal generator 35, 36 through lines 27, 27*a*, the generator generating no signal of its own, but rather issuing this analog output signal directly to line 28, 28*a*.

Accordingly only the analog output signal at output 39 is returned to the signal detection module 4 through the upper branch in FIG. 5, the detection module only comparing whether the output signal 3 generated in signal detection module 3 agrees with the returned output signal.

Agreement is checked again by way of a corresponding comparison of both CPU's 9 and 10 using digital bus 15.

If the result is positive, the digital signal generated from the analog output signal is forwarded through black channel 16.

Figure 6:
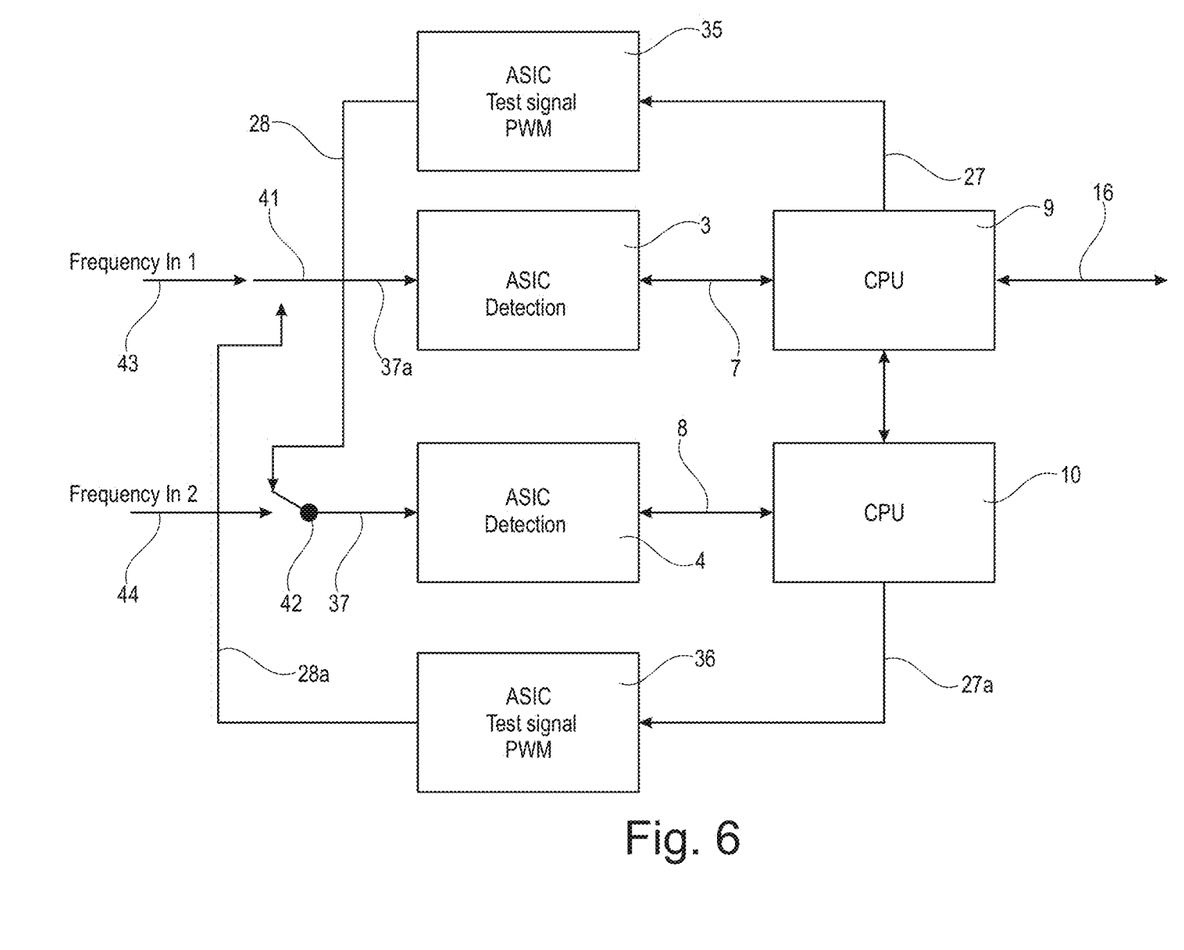
FIG. 6: A test circuit for frequency measurement, for example in an encoder or a counter, a block diagram for the pre-processing of measured data through a safe channel.

In the exemplary embodiment according to FIG. 6, which also characterizes free programmability of the two signal detection modules 3, 4, a respective signal generator 35, 36 is controlled by the two CPU's 9, 10 through lines 27, 27a and the respective controlled signal generator 35, 36 generates a pulse width modulation (PWM), which is understood to be only an example.

The signal generator can use any other modulation method, or an amplitude frequency or phase modulation.

The output of the frequency generator is fed through lines 28 and 28a to a respective switch 41, 42 disposed on the input side.

The cycle of the respective switch 41, 42 is thus controlled by the two CPU's 9, 10.

Accordingly, one frequency signal is applied at each frequency input 43, 44, the frequency signal being switched over according to the cycle of the switch 41, 42. This means that cycled switching takes place between the two frequency inputs 43, 44, and the signal thus generated is fed through line 37a, 37 to the input of the respective signal detection module 3, 4.

Thus, the signal detection modules 3, 4 are self-tested because this results in rectified measurement data processing.

If a specific signal is generated in the upper signal detection module 3 and the associated frequency generator 35, it is expected that the same signal will also be generated by the lower signal detection module 4 in connection with frequency generator 36.

Only if the comparison of these two signals provides a positive result does CPU 10 connect CPU 9 through and the digital signal freed by the test signal is output by the black channel 16.

As indicated already in the general description, in one exemplary embodiment a digital output can also be tested. Accordingly, in the exemplary embodiment according to FIG. 5, a digital output can also be checked using the same measures. The description provided for FIG. 5 for two analog outputs applies analogously for digital outputs as well.

FIG. 7 generally shows the modular design of a respective CPU 9 and 10 described in the preceding exemplary embodiments.

When both CPU's are identically designed, the same descriptions apply for each respective CPU.

FIG. 7 generally represents that a scanning means 63 is disposed at an input channel 47, 48, respectively, the scanning means scanning the respective input channel 47, 48 at, for example, a scanning rate of one kHz.

The signal thus generated is detected by the freely-programmable signal detection modules 3, 4 according to the invention and forwarded to the output bus 49, 50.

This figure only schematically represents the fact that a series of bus interface connections 51, 51a, 51b are disposed at output bus 49, thereby illustrating the ability to selectively control different computation modules 53, 54, 55 starting from output bus 49.

Furthermore, it can be seen that a through-switching of the digital signal generated at the output of the signal detection module 3, 4 can occur directly to the output through the respective bus interface connections 51, 52, namely either to the black channel 16 or the non-fail-safe data channel 19.

Accordingly, the different computation modules 53, 54, 55 can be controlled by way of a corresponding programming by the respective CPU 9, 10 and a formation of a mean value of the digital signal generated at the output of signal detection module 3, 4 is done in the computation module 53.

Also, the computing module 54 can optionally generate a minimum through a so-called safety cycle or computing module 55 can generate a maximum through the safety cycle.

All signals generated by computing modules 53, 55 can be queried through an associated output line 60, 61 by a mode switch 58, 59 and are routed to the input of a decision module 62.

If channel 65 is identified as channel A and channel 66 is identified as channel B, the lines connected at the output of the mode switch 58, 59 are then identified as channels A' and B'.

These channel signals are then fed to a two-channel decision module 62 which then issues a black channel packet 67 corresponding to the programmed status.

The status of the decision module is output either through black channel 16 or through the non-fail-safe data channel 19.

The output of the decision module 62, and the generation of the black channel packet 67 can involve the mean value from A' and B' or the maximum from A and B or the minimum from A and B.

All required signals are likewise output either through the black channel 16 or the non-fail-safe channel 19.

Accordingly, output proceeds analogously through both channels to the downstream programmable logic module 17 and to the output thereof through I/O bus 18 to the safety control unit 70.

Another safety cycle 46 is used, which in FIG. 7 is shown in the top position. Here, a scanned signal 57 is generated at a scanning frequency of 1 kHz, and from these signals either the mean value, the minimum or the maximum is formed corresponding to the scanned signals so generated.

The computing modules 53-55 previously mentioned are controlled accordingly and forward the output values determined thereby to the associated mode switch 58, 59 through output lines 60, 61.

Accordingly, a value such as the mean value or the minimum or maximum is selectively fed to the decision module 62 depending on the switch position of the mode switch 58, 59 and since there are two separate channels 65, 66 a decision is made in the decision module 62 that the signals from the channels 65, 66 proceed precisely the same and synchronously, and only then is there an output of the detected digital signals selectively or together through black channel 16 or through the non-fail-safe data line 19.

DRAWING LEGEND

1 Safety module
2 Data collection module
3 Signal detection module (configurable)
4 Signal detection module (configurable)
5 Interface
6 Interface
7 Digital bus 7a
8 Digital bus 8a
9 CPU1 (clock)
10 CPU2 (check)

11 Clock line
12 Galvanic separation
13 Galvanic separation
14 Data evaluation module
15 Digital bus
16 Black channel (fail-safe)
17 Logic module (programmable)
18 I/O bus
19 Data channel (non-fail-safe)
20 Test circuit
21 Analog input
22 Analog input
23 Adder
24 Adder
25 Signal generator
26 Signal generator
27 Line 27a
28 Line 28a
29 Modulation line
30 Modulation line
31 Temperature input
32 Temperature input
33 Digital input (logical 1)
34 Digital input
35 Signal generator
36 Signal generator
37 Line 37a
38 Measurement connection 38a
39 Analog output
40 Analog output
41 Switch
42 Switch
43 Frequency input
44 Frequency input
45 Scanning means
46 Scanning means
47 Input channel
48 Input channel
49 Output bus
50 Output bus
51 Bus interface connection
52 Bus interface connection
53 Computing module
54 Computing module
55 Computing module
56 Safety cycle
57 Scanned signal
58 Mode switch
59 Mode switch
60 Output lines
61 Output lines
62 Decision module
63 Scanning means
64 Scanning means
65 Channel A 65'
66 Channel B 66'
67 Black channel packet
68
69
70 Safety control unit

What is claimed is:

1. A method for operating a safety module for a programmable logic control system, wherein the safety module comprises an assembly consisting of a plurality of modules with a plurality of function blocks connected through at least one internal bus, and at least one Central Processing Unit (CPU), the safety module being configured to be connected through at least one interface to external sensors and switches/buttons, actuators, optical/acoustic indicators, and displays/monitors for detecting at least one measurement signal, wherein a test signal tuned to an input filter of a first signal detection module, the test signal being generated by a second signal detection module of identical configuration as the first signal detection module, is added to each of the at least one measurement signal, and after scanning and filtering by the first signal detection module, the test signal is removed again by a next CPU of the at least one CPU, and a test is performed by comparing the test signal thus recovered to that of a second, redundant test signal such that if both signals are within a configurable tolerance band, the test is deemed to have passed, and in a next test cycle, the test signal is added to another of the at least one measurement signal and thereby the first signal detection module is tested.

2. The method according to claim 1, wherein the safety module operates in two channels and a self-test is implemented.

3. The method according to claim 1, wherein the signal detection modules are freely configurable by the user.

4. The method according to claim 1, wherein a galvanic separation exists between the at least two modules.

5. The method according to claim 4, wherein after galvanic separation, the signals are further processed in two independent CPU's.

6. The method according to claim 5, wherein the processed signals are sent through a communication interface according to a black channel principle.

7. The method according to claim 1, wherein the measurement signals are analog or digital.

* * * * *